F. E. BUMP & S. J. BARKMAN.
HEADLIGHT CONTROL.
APPLICATION FILED MAR. 16, 1914.
1,105,247.
Patented July 28, 1914.
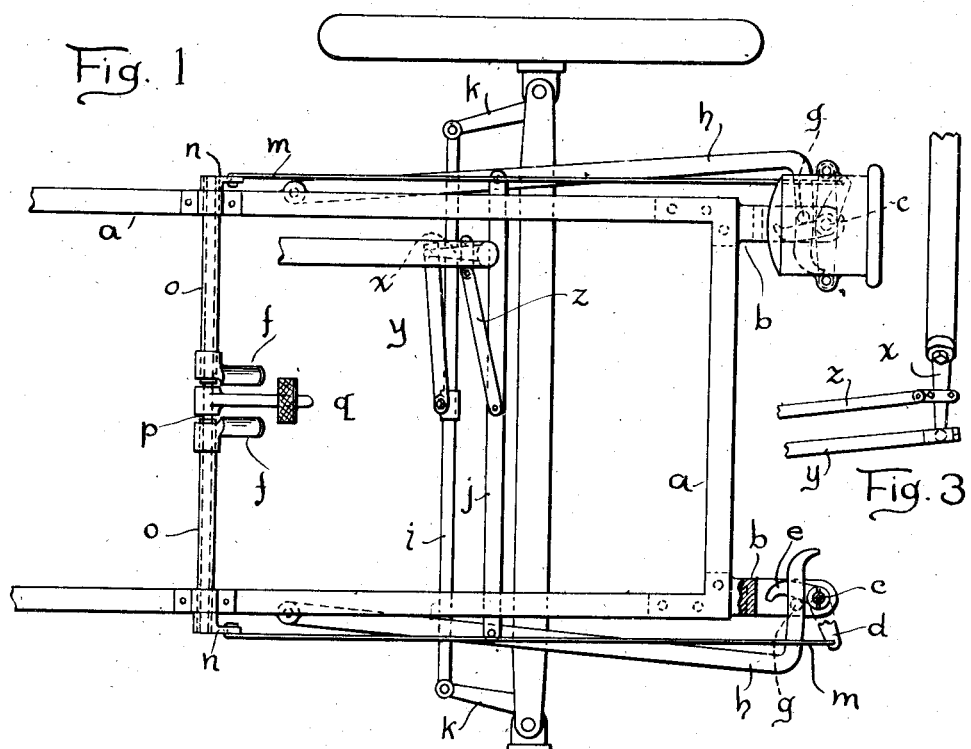
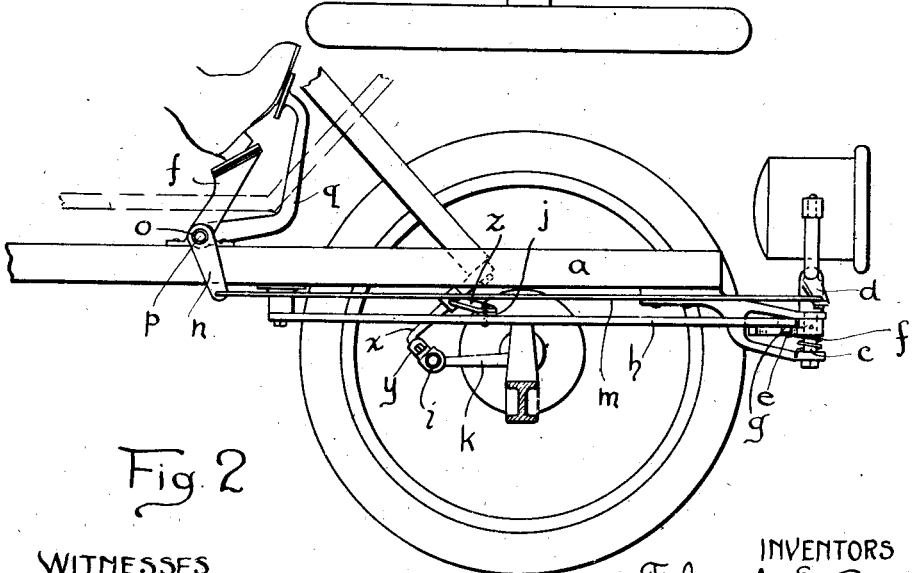
WITNESSES
INVENTORS
Floyd E. Bump
Stewart J. Barkman
BY
Raymond H. Parker.
ATTORNEY

UNITED STATES PATENT OFFICE.

FLOYD E. BUMP AND STEWART J. BARKMAN, OF FENTON, MICHIGAN.

HEADLIGHT CONTROL.

1,105,247.  Specification of Letters Patent.  Patented July 28, 1914.

Application filed March 16, 1914. Serial No. 824,905.

*To all whom it may concern:*

Be it known that we, FLOYD E. BUMP and STEWART J. BARKMAN, citizens of the United States, residing at Fenton, county of Genesee, State of Michigan, have invented a certain new and useful Improvement in Headlight Control, and declare the following to be a full, clear, and exact description of the same, such as will enable others skilled in the art to which it pertains to make and use the same, reference being had to the accompanying drawings, which form a part of this specification.

This invention relates to dirigible headlights for vehicles and has for its object apparatus for controlling the headlights which is actuated by the steering gear to operate each headlight separately so that one headlight is caused to turn with the wheels while the other headlight remains stationary. When the wheels are turned in the other direction the light that has been stationary becomes the one that turns and the light that has turned becomes the one that is stationary. This apparatus is also so arranged that either one of the headlights may be operated by the driver independent of the operation by the steering gear.

Another feature is a differential throw for the headlights so that the headlight turns faster initially than later.

In the drawings: Figure 1, is a plan view. Fig. 2, is a side view of the vehicle chassis showing a side elevation of the headlight and the controlling apparatus. Fig. 3, is a detail of the steering post.

The frame of the car is represented as *a*. To the forward end of this at each side is attached a lamp bracket *b*. Each lamp bracket is bifurcated so that it has two arms through which the lamp post *c* passes. Each lamp post has two arms fastened to it, an arm *d* above the bracket *b*, and an arm *e* below the upper fork of the lamp bracket. Of course the arms may be fastened at different points on the post to accommodate changed conditions on various makes of cars. A spring *f* has one end attached to the lamp bracket, and the other end attached to the lamp post or one of the arms that is fast to the lamp post. The purpose of this spring is to return the lamp post to its initial position after it has been turned, this initial position being the position at which the rays of the lamp are projected directly forward. The arm *e* is a hooked arm, that is, the end of it curves out in hook form. On each side of the frame, a lever *h* is pivoted, the end of the lever being bent to a right angular relation with respect to the main part of the lever. Each lever arm carries a depending pin *g* which wipes the inside hook-like arm *e*. The two levers *h* are connected by a cross bar *j*.

*k k* are the steering knuckle arms connected by the draw link *i*. An arm *x* on the steering post is connected with the draw link and cross bar by links *y* and *z* respectively. However, the particular connecting means between the steering gear and the levers is not an essential part of this invention. When the steering wheels are turned in either direction this operates the two levers *h*. If the pair of levers *h* are thrown to the right, the pin *g* will be thrown out of engagement with the hooked arm *e* of the right lamp post, but the pin *g* of the left-hand lever *h* will wipe the inside of the hooked arm *e* of the left lamp post. Hence the left lamp will be turned.

The turning is a differential one, that is, the turning will be more rapid at the beginning than later, for the pin *g* being caused to travel in an arc whose center is the pivotal point of the lever *h* will always travel at the same rate with respect to the travel of the steering wheels. But as the pin wipes the inside surface of the hooked arm *e* it rides outward on the hooked arm and hence the leverage of the hooked arm *e* is increased, but the movement is correspondingly decreased. The purpose of this is to initially turn the light faster than the steering wheel so that when going around a corner the light in the initial stages of turning precedes the steering wheels so as to clearly show the road ahead before the steering wheels are thrown around. After the light has been turned through the initial part of its arc of swing, its speed of turning with respect to the steering wheels is decreased so that it will not turn any farther than the steering wheels. It will also be noticed that by using this arm and pin arrangement for the steering gear to turn the lights, that each light may be separately controlled by the driver of the car. This is easily effected by the cord *m* attached to the arm *d*. This runs to a crank arm *n* attached to the sleeve *o* that is rotatably mounted upon the shaft *p*. On the inside end of the sleeve *o* is located a pedal $g$. The construction with respect to the other lamp is the same. Of course the exact connection between the arm $d$ and the driver may be varied considerably without affecting our invention, as the particular operating connections for turning the light by action of the foot are old.

We arrange the pedals $f$ on either side of the brake lever and below and to the rear of it for the purpose of making it possible to operate the lights without removing one's foot from the brake-pedal.

What we claim is:

1. The combination with a chassis provided with running gear and steering gear, of a dirigible head-light, an arm attached thereto, a lever provided with a pin, and means for automatically returning the headlight to initial position when the pressure of the pin against the arm is relieved, the said lever and pin being arranged to wipe the said arm and move outward with respect thereto for the purpose of decreasing the rate of turn toward the later stages of the turning.

2. The combination with a chassis provided with running gear and steering gear, of a pair of dirigible headlights, an arm on each headlight, a pair of levers pivoted to the chassis, each one being provided with a pin that wipes the inside face of the adjacent arm, connections between the pair of levers and the steering gear, and means for automatically returning the headlights to initial position when the pin is withdrawn.

3. The combination with a chassis provided with running gear and steering gear, of a pair of dirigible headlights, each being provided with two arms, a pair of levers pivoted to the chassis, each being provided with a pin that wipes the inside face of the adjacent arm, connections between the pair of levers and the steering gear, connections running from the other arms of the dirigible lights to a position adjacent the driver, so that the lights may be also controlled by the driver, and spring means for causing the arms of the dirigible lights to follow the pins as they are retracted.

In testimony whereof, we sign this specification in the presence of two witnesses.

FLOYD E. BUMP.
STEWART J. BARKMAN.

Witnesses:
H. A. McLELLAN,
C. J. CUMMINGS.